(12) United States Patent
Ogawa

(10) Patent No.: US 7,475,266 B2
(45) Date of Patent: Jan. 6, 2009

(54) IMAGE CAPTURING APPARATUS THAT PERFORMS DYNAMIC FREQUENCY CONTROL OF BUFFER MEMORY DURING MOVING IMAGE CAPTURE

(75) Inventor: Hideaki Ogawa, Saitama (JP)

(73) Assignee: Fujifilm Corporation, Tokyo (JP)

( * ) Notice: Subject to any disclaimer, the term of this patent is extended or adjusted under 35 U.S.C. 154(b) by 433 days.

(21) Appl. No.: 11/280,389

(22) Filed: Nov. 17, 2005

(65) Prior Publication Data
US 2006/0103741 A1 May 18, 2006

(30) Foreign Application Priority Data
Nov. 18, 2004 (JP) ............................. 2004-334799
Sep. 28, 2005 (JP) ............................. 2005-282710

(51) Int. Cl.
*G06F 1/26* (2006.01)
(52) U.S. Cl. ..................... 713/322; 348/231.99; 710/57
(58) Field of Classification Search ................. 713/322; 348/231.99; 710/57
See application file for complete search history.

(56) References Cited
U.S. PATENT DOCUMENTS
2003/0184662 A1* 10/2003 Porter et al. ............. 348/231.1
2005/0086553 A1* 4/2005 Spencer ...................... 713/600

FOREIGN PATENT DOCUMENTS
JP 2004-056741 A 2/2004

* cited by examiner

*Primary Examiner*—Thomas Lee
*Assistant Examiner*—Albert Wang
(74) *Attorney, Agent, or Firm*—Birch, Stewart, Kolasch & Birch, LLP

(57) ABSTRACT

A digital camera is provided with a data amount detector and a clock control circuit. The data amount detector detects the amount of image data stored in an SDRAM in capturing a moving image. The clock control circuit controls a transfer speed of the image data from the SDRAM to a memory card by changing a frequency of a system clock based on the detecting result from the data amount detector. When the data amount is less than a first threshold value set near a lower limit of a memory capacity of the SDRAM, the clock control circuit reduces the data transfer speed by lowering the frequency of the system clock; meanwhile, the data amount is more than a second threshold value set near an upper limit of the memory capacity of the SDRAM, the clock control circuit accelerates the transfer speed by raising the frequency of the system clock.

8 Claims, 6 Drawing Sheets

FREQUENCY OF SYSTEM CLOCK: 48MHz

FREQUENCY OF SYSTEM CLOCK: 96MHz (1)48MHz (2)48MHz (3)96MHz (4)96MHz (1)'48MHz (1)48MHz (2)96MHz (3)96MHz (4)96MHz (1)'48MHz

IMAGE CAPTURING APPARATUS THAT PERFORMS DYNAMIC FREQUENCY CONTROL OF BUFFER MEMORY DURING MOVING IMAGE CAPTURE

BACKGROUND OF THE INVENTION

1. Field of the Invention

The present invention relates to an image capturing apparatus capable of controlling a recording speed of recording media during a capture of a moving image.

2. Description of the Related Arts

There is a widespread use of a digital camera in which a signal output from a solid-state imaging device such as a CCD is converted into image data of digital signal form by an A/D converter, and the image data is recorded in a recording medium such as a built-in memory or a removable memory card. This type of digital camera has a moving image capture function as well as a still image capture function.

In the digital camera, field images are sequentially output from the CCD at a constant frame rate (e.g. 30 frames/sec.) during the capture of the moving image. The field images are temporarily stored in a buffer memory. Subsequently, the filed images are read out from the buffer memory, and recorded in the recording media after various kinds of image processing including the YC conversion and the compression processing are applied thereto (see Japanese Patent Laid-Open Publications No. 2004-56741).

In the moving image capturing, many field images are recorded in the recording media, and the amount of the image data output from the CCD becomes very large. In some models or types of recording media, the recording (writing) operation might be so slow that the recording media may possibly store unwatchable moving images in which the frames are missed in parts.

As a method for solving the above problem, it is considered that a high frequency system clock for operating a CPU, the buffer memory, the recording media, and so forth is used to accelerate a transfer speed of the image data (a reading speed of the buffer memory, a recording speed of the recording media). However, if the high frequency system clock is used, it causes another problem that the power consumption is increased.

SUMMARY OF THE INVENTION

An object of the present invention is to provide an image capturing apparatus capable of supplying moving images in which frames are continuous while reducing power consumption.

In order to achieve the above object, an image capturing apparatus of the present invention is provided with a data amount detector and a clock controller. The data amount detector detects the amount of image data stored in the buffer memory during a capture of a moving image. The clock controller controls a transfer speed of the image data from the buffer memory to a recording medium by changing a frequency of a system clock according to the data amount stored in the buffer memory.

In a preferable embodiment of the present invention, a comparator compares the data amount with a first threshold value. When the data amount is more than the first threshold value, the frequency of the system clock is raised to accelerate the data transfer speed (a reading speed of the buffer memory, a recording speed of the recording media). The first threshold value is approximately 50% of a memory capacity of the buffer memory.

In another preferable embodiment of the present invention, the clock controller raises the frequency of the system clock to accelerate the data transfer speed when the data amount is more than the first threshold value, while lowers the frequency of the system clock to reduce the data transfer speed when the data amount is less than a second threshold value, which is smaller than the first threshold value. The first and second threshold values are respectively near 60% of the memory capacity of the buffer memory and near 30% thereof.

In the present invention, the frequency of the system clock is changed according to the data amount stored in the buffer memory to control the transfer speed of the image data from the buffer memory to the recording medium. Thereby, in comparison with the case wherein the system clock is always set at a high frequency, the power consumption can be reduced and, at the same time, the favorable moving images in which the frames are continuous can be obtained.

BRIEF DESCRIPTION OF THE DRAWINGS

The above and other subjects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE PREFERRED EMBODIMENTS

Figure 1:
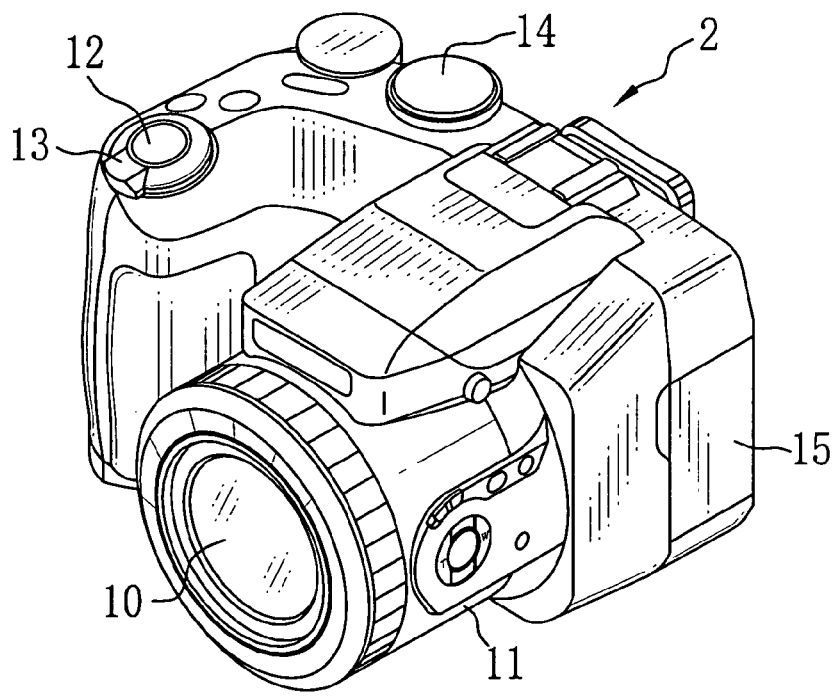
FIG. 1 is a front perspective view of a digital camera to which the present invention is applied.
Figure 2:
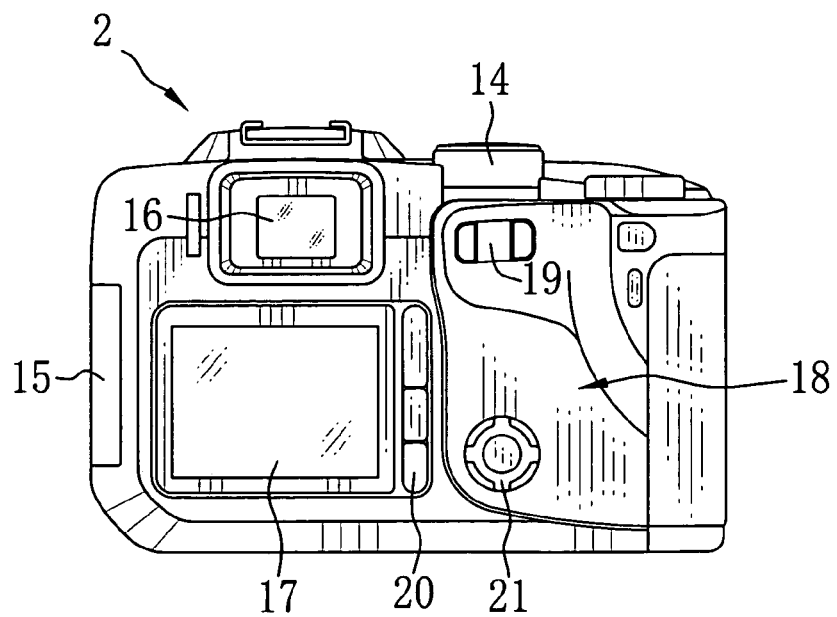
FIG. 2 is a rear view of the digital camera.

In FIGS. 1 and 2, a lens barrel 11 holding a taking lens 10 is incorporated in a front face of a digital camera 2. A release button 12, a power switch 13, and a mode dial 14 are provided on a top surface of the digital camera 2. An openable lid 15 is provided on a side surface of the digital camera 2. When the lid 15 moves to an open position, a memory card slot appears for loading a memory card 51 (see FIG. 3) as a recording medium removably.

A finder eye-piece window 16 constituting an electronic viewfinder, a liquid crystal display (LCD) 17, and an operating section 18 are provided in a rear surface of the digital camera 2. Through images (not recorded in the memory card 51), various menu screens, and a recorded image read out from the memory card 51 are displayed on the LCD 17. The operating section 18 is constituted of a zoom button 19, a menu button 20, an arrow key 21, and so forth. The zoom button 19 moves a step zoom lens of the taking lens 10 between a wide side and a telephoto side to change magnification. The menu button 20 is operated to display the menu screen on the LCD 17 and to determine a selected content. The arrow key 21 moves a cursor in the menu screen.

The mode dial 14 is rotatably operated to select one of a still image capture mode for capturing the still image, a moving image capture mode for capturing the moving image, a reproduction mode for displaying the image frame on the LCD 17, and a setting mode for performing various kinds of setting. In the moving image capture mode, in addition to capture the moving image, ambient sound is recorded in the memory card 51 through a microphone (not shown).

The release button 12 is a two-step switch. When the release button 12 is pushed lightly (half-depression) after framing the subject by the LCD 17, various kinds of capturing preparation processing for the capture including determining exposure conditions (AE) and automatic focusing (AF) are performed. In this state, when the release button 12 is pushed strongly (full-depression), the subject is captured under the determined exposure conditions.

Figure 3:
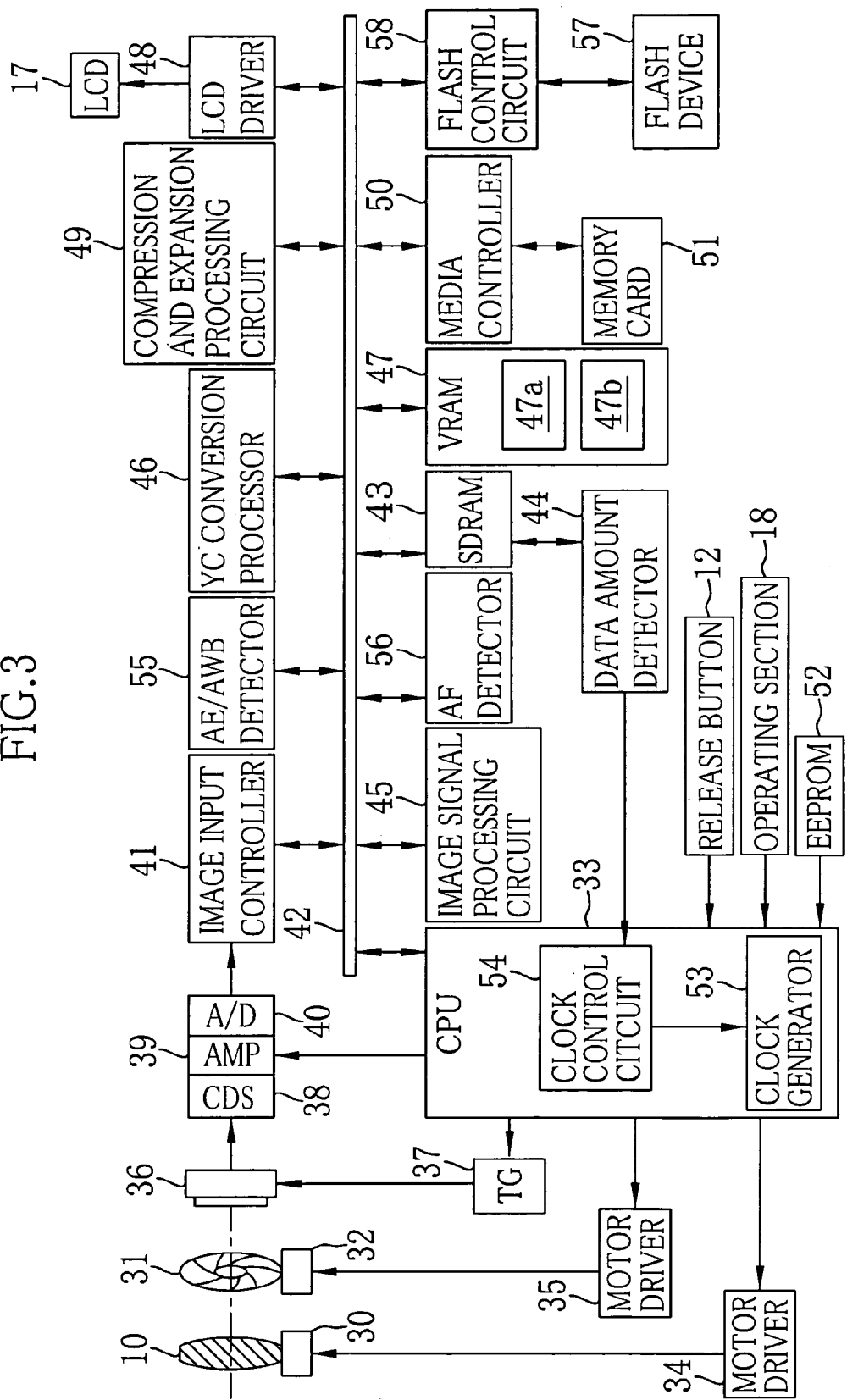
FIG. 3 is a block diagram showing an electrical structure of the digital camera.

In FIG. 3, a lens motor 30 is connected with the taking lens 10. An iris motor 32 is connected with an aperture stop 31. The motors 30, 32 are stepping motors, and controlled by driving pulse sent from motor drivers 34, 35, which are connected with a CPU 33.

The lens motor 30 moves the step zoom lens to the wide side or the telephoto side in response to the operation of the zoom button 19, and then moves the focus lens to an in-focus position at each focal distance. The iris motor 32 operates the aperture stop 31 to adjust an aperture size.

A CCD 36 for imaging the subject image is disposed behind the taking lens 10. A timing generator (TG) 37 controlled by the CPU 33 is connected with the CCD 36, and a timing signal (clock pulse) output from the TG 37 is input in the CCD 36 to control charge accumulation and reading the charge.

The image signal output from the CCD 36 is put into a correlation double sampling circuit (CDS) 38 to be output as the image signals of R, G, and B exactly corresponding to the accumulated charge of each cell of the CCD 36. The image signal output from the CDS 38 is amplified by an amplifier (AMP) 39 to be converted into image data in a digital form by an A/D converter 40.

An image input controller 41 is connected with the CPU 33 through a bus 42, and controls the CCD 36, the CDS 38, the AMP 39, and the A/D converter 40 in accordance with control instructions from the CPU 33. The image data output from the A/D converter 40 is temporarily recorded in the SDRAM 43 as a buffer memory.

A data amount detector 44 is connected with the SDRAM 43. The data amount detector 44 is detecting the amount of the image data recorded in the SDRAM 43 during the capture of the moving image, and keeps sending the detecting results to a clock control circuit 54.

An image signal processing circuit 45 applies various kinds of image processing, such as gradation conversion, white-balance correction, γ-correction processing, and so forth to the image data from the A/D converter 40, and stores the image data in the SDRAM 43. A YC conversion processor 46 reads out the image data processed in image signal processing circuit 45 from the SDRAM 43 to convert it into a luminance signal Y and color difference signals Cr,Cb.

A VRAM 47 is a memory for outputting the through image to the LCD 17, and the image data through the image signal processing circuit 45 and the YC conversion processor 46 is stored therein. Two memories 47a, 47b, each for one frame, are provided in the VRAM 47 so as to write and read the image data in parallel. The image data stored in the VRAM 47 is converted into an analog composite signal in a LCD driver 48 to be displayed as the through image on the LCD 17.

A compression and expansion processing circuit 49 applies image compression to the image data with a predetermined compression format (e.g. JPEG format) after the image data is converted by the YC conversion processor 46. The compressed image data is once written in the SDRAM 43 and read by the media controller 50 to be stored in the memory card 51.

An EEPROM 52 is connected with the CPU 33 in addition to the release button 12 and the operating section 18. Various control programs, setting information, and so forth are recorded in the EEPROM 52. The CPU 33 reads the information from the EEPROM 52 to the SDRAM 43 as a work memory, and performs various kinds of processing.

The CPU 33 has a clock generator 53 for generating the system clock and a clock control circuit 54 for changing a frequency of the system clock. The clock generator 53 generates the system clock of, for example, 96 MHz, 48 MHz, and 24 MHz under the control of the clock control circuit 54, and sends the system clock to each section of the digital camera 2.

Figure 4A:
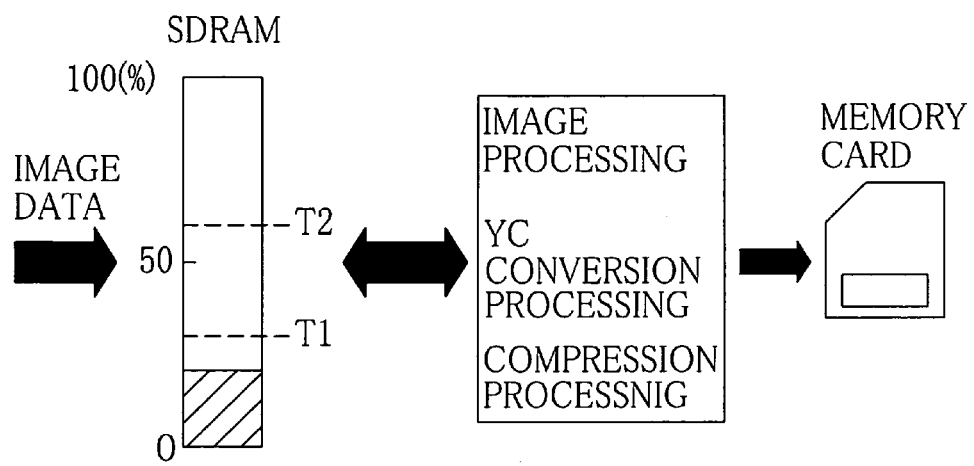
FIG. 4A is an explanatory view schematically showing the way of a clock control circuit to control the speed for transferring image data, wherein the amount of the image data is less than a first threshold value T1.
Figure 4B:
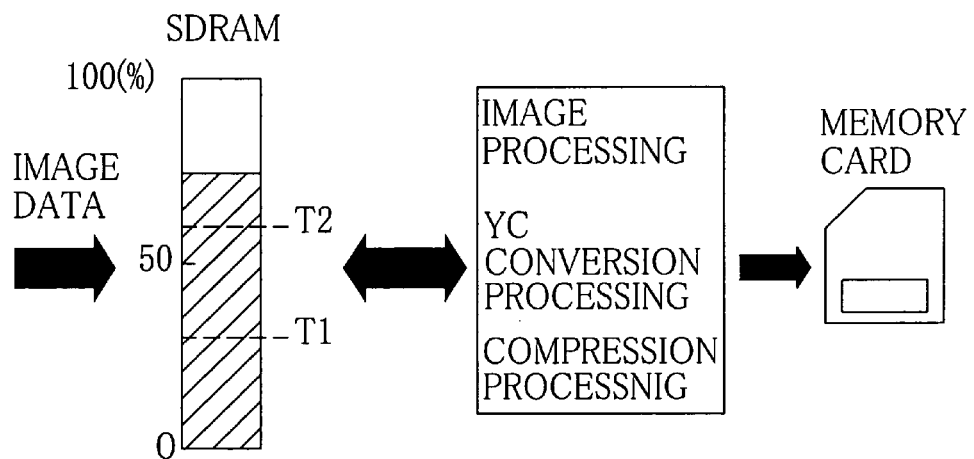
FIG. 4B is an explanatory view schematically showing the way of controlling the transfer speed, wherein the data amount is more than a second threshold value T2.

The clock control circuit 54 changes the frequency of the system clock based on the detecting results of the data amount detector 44 during the capture of the moving image. As shown schematically in FIGS. 4A and 4B, the detecting result of the data amount detector 44 is less than a first threshold value T1 set near 30% of a memory capacity of the SDRAM 43 (FIG. 4A), the clock control circuit 54 lowers the frequency of the system clock to 48 MHz, for example. Meanwhile, the result of the data amount detector 44 is more than a second threshold value T2 set near 60% of the memory capacity of the SDRAM 43 (FIG. 4B), the clock control circuit 54 raises the frequency of the system clock to 96 MHz, for example.

Figure 5A:
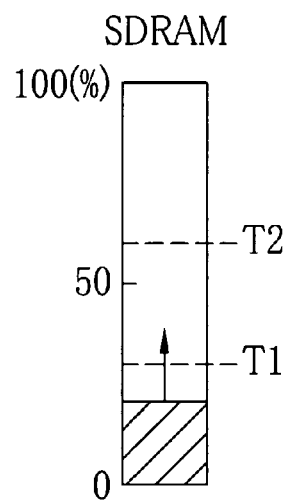
FIGS. 5A-5E are explanatory views schematically showing a transition of the image data amount to be stored in SDRAM, wherein the threshold values are two.
Figure 5B:
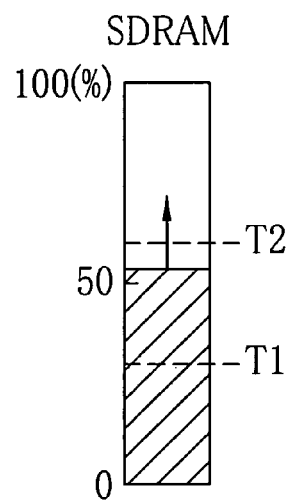

When the above control is performed by clock control circuit 54, the image data amount stored in the SDRAM 43 transits as FIGS. 5A-5E. Namely, since the data amount is less than T1 immediately after the start of moving image capture in FIG. 5A, the frequency of the system clock is 48 MHz. In this state, since a transfer speed of the image data from the SDRAM 43 to the memory card 51 is slow, the data amount in the SDRAM 43 is increased, as shown in FIG. 5B, as the moving image capture proceeds.

Figure 5C:
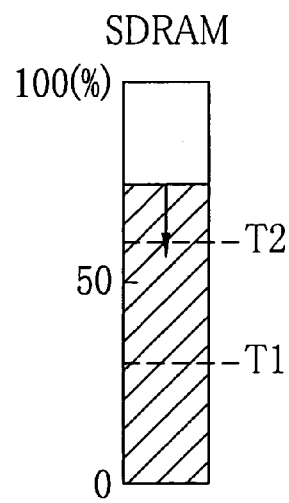

As the moving image capture proceeds further from FIG. 5B, the data amount becomes more than T2 as shown in FIG. 5C, and the frequency of the system clock is changed to 96 MHz. In this state, since the data transfer speed is fast, the data amount is decreased, as shown in FIG. 5D, as the moving image capture proceeds.

Figure 5D:
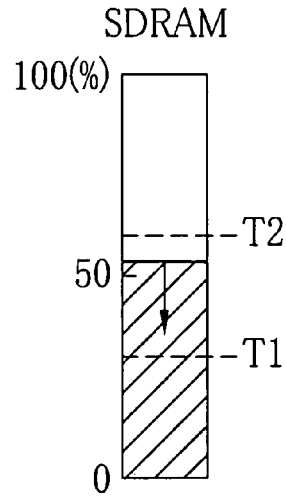
Figure 5E:
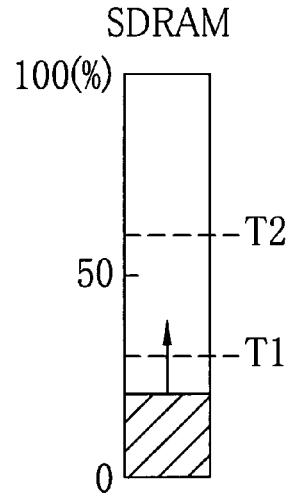

As the moving image capture proceeds still further from FIG. 5D, the data amount becomes less than T1, e.g. FIG. 5E which is the same condition as FIG. 5A, and the frequency of the system clock is changed to 48 MHz.

In FIG. 3, an AE/AWB detector 55, an AF detector 56, and a flash control circuit 58 are connected with the bus 42. The AE/AWB detector 55 determines an exposure amount and a collection amount in the white balance (AWB), and adjusts the aperture size of the aperture stop 31 when capturing the through image, according to the exposure amount. When an appropriate exposure can not be obtained with the aperture stop 31, the charge accumulation time is controlled. In capturing the still image, combination of the aperture stop 31 and the charge accumulation time (electronic shutter) is determined according to the exposure amount. Additionally, amplifying gains for blue and red colors are controlled according to the collection amount in the white balance. The AF detector 56 detects a focused position based on the contrast obtained from the image data by shifting the taking lens 10. The flash control circuit 58 controls the operation of the flash device 57.

Although the AE/AWB, AF detectors 55, 56 operate in a predetermined cycle even during displaying of the through image, they start measuring when the release button 12 is half depressed, and keep sending the measurement results to the CPU 33. The CPU 33 controls the operation of the taking lens 10, the aperture stop 31, and the CCD 36 based on the measurement results of the detectors 55, 56.

A flash device 57 is provided with various emission modes, such as an automatic emission mode in which the flash is automatically emitted when subject brightness is low, a forced emission mode in which the flash is emitted regardless of the subject brightness, and an emission inhibiting mode in which the emission of the flash is inhibited, and a red-eye reducing mode in which the red-eye phenomenon is reduced. These emission modes can be selected by operating the operating section 18.

Figure 6:
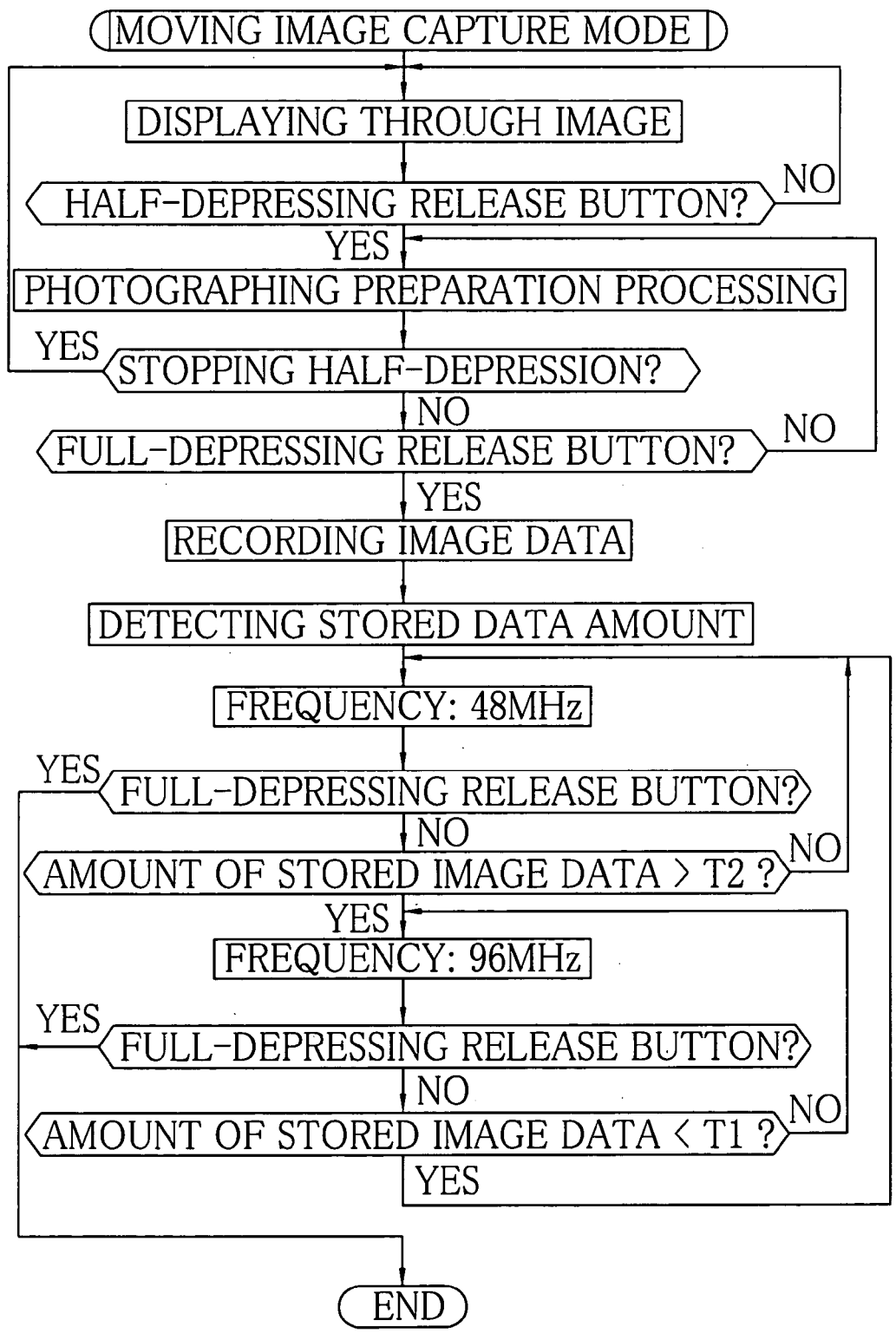
FIG. 6 is a flow chart showing processing procedure of the digital camera under a moving image capture mode.

Next, the operation of the digital camera 2 having the above structure is explained in reference to the flow chart in FIG. 6. For capturing the subject with the digital camera 2, the digital camera 2 is turned on by operating the power switch 13. Then, the still image capture mode or the moving image capture mode is selected by operating the mode dial 14.

In the still image capture mode, the subject light, which has entered through the taking lens 10 and the aperture stop 31, is converted photoelectrically by the CCD 36, and then sampled in the CDS 38. The image signal output from the CDS 38 is amplified by the AMP 39 to be converted into the image data by the A/D converter 40.

The image data converted into the digital data is sequentially recorded in the SDRAM 43 through the image input controller 41 after various kinds of image processing are applied to the image data in the image signal processing circuit 45. The image data recorded in the SDRAM 43 is read by the YC conversion processor 46 to be converted into the luminance signal Y and the color difference signals Cr, Cb. The image data converted into the signals is stored in the VRAM 47. The LCD driver 48 reads out the image data from the VRAM 47 to display the image data as the through image on the LCD 17.

When the release button 12 is half depressed during the displaying of the through image, the exposure amount, the white balance, and the focus are detected in the AE/AWB detector 55 and the AF detector 56, and the capturing preparation processing is performed based on the detecting results. Note that the AE, AF, and AWB are performed in a predetermined cycle even during the displaying of the through image.

Next, when the release button 12 is fully depressed, the still image is captured based on the determined exposure amount, and the obtained image data is recorded in the SDRAM 43. Subsequently, the image data recorded in the SDARM 43 is compressed in the compression and expansion processing circuit 49, and stored in the SDRAM 43 again. Finally, the media controller 50 reads out the compressed image data from the SDRAM 43 to record it in the memory card 51.

As shown in FIG. 6, when the moving image capture mode is selected, the through image is displayed on the LCD 17. Subsequently, the release button 12 is half depressed for the preparation processing, and then fully depressed to start the moving image capture. The image data digitalized through the CCD 36, the CDS 38, the AMP 39, and the A/D converter 40 is recorded in the SDRAM 43 through the image input controller 41 after various kinds of image processing are applied to the image data in the image signal processing circuit 45.

When the moving image capture is started, the image data amount stored in the SDRAM 43 is detected by the data amount detector 44. The detecting results are sent to the clock control circuit 54 in the CPU 33. The frequency of the system clock is normally set at 48 MHz in the clock control circuit 54, and the system clock having the frequency of 48 MHz is sent from the clock generator 53 to each section. The operation of each circuit connected to the bus 42 including the SDRAM 43, the media controller 50, compression and expansion processing circuit 49, and YC conversion processor 46 is controlled by the system clock.

When the data amount is more than T2 as the moving image capture proceeds, the frequency of the system clock is changed from 48 MHz to 96 MHz by the clock control circuit 54, and the system clock having the frequency of 96 MHz is sent from the clock generator 53 to each section. Thereby, the operation speed of each section is accelerated. For instance, the transfer speed of the image data from the SDRAM 43 to the memory card 51 accelerates.

When the data transfer speed is accelerated, the data mount in the SDRAM 43 is gradually decreased. Then, when the data amount becomes less than T1, the frequency of the system clock is changed from 96 MHz to 48 MHz by the clock control circuit 54, and the system clock having the frequency of 48 MHz is sent from the clock generator 53 to each section. The above series of processing in the clock control circuit 54 is continued until the moving image capture is finished by depressing the release button 12 fully again or by running out the predetermined time period for the moving image capture.

When the detecting result of the data amount detector 44 is less than the first threshold value T1, the clock control circuit 54 lowers the frequency of the system clock to reduce the data transfer speed. Thus, the power consumption in the digital camera 2 can be reduced. Meanwhile, when the data amount is more than a second threshold value T2, the clock control circuit 54 raises the frequency of the system clock to accelerate the data transfer speed. Thus, the favorable moving image in which the frames are continuous can be obtained.

In the above embodiment, although the frequency of the system clock is changed from 48 MHz to 96 MHz, or from 96 MHz to 48 MHz, it may be changed continuously or in three steps according to the data amount.

Moreover, in the above embodiment, the first threshold value T1 is set near 30% of the memory capacity of the SDRAM 43, while the second threshold value T2 is set near 60% thereof; however, the threshold values T1, T2 can be changed suitably according to the specification of the SDRAM 43 and the memory card 51. In addition, the frequency of the system clock is not limited to that of the above embodiment.

Figure 7A:
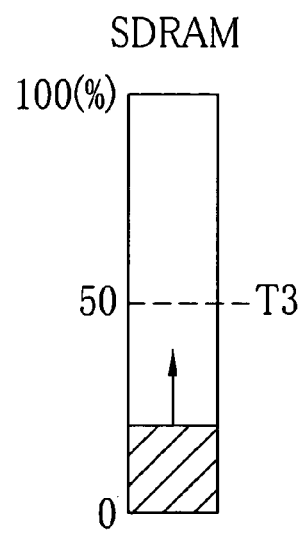
FIGS. 7A-7E are explanatory views schematically showing the transition of the image data amount to be stored in the SDRAM, wherein the threshold value is one.
Figure 7B:
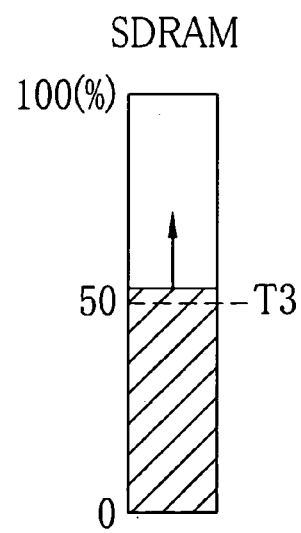
Figure 7C:
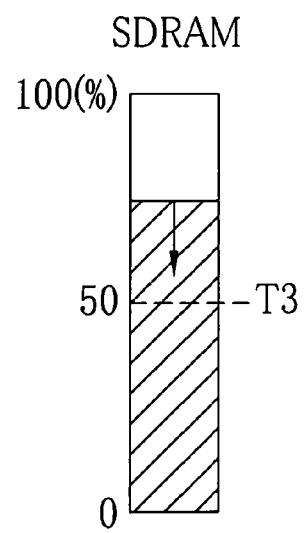
Figure 7D:
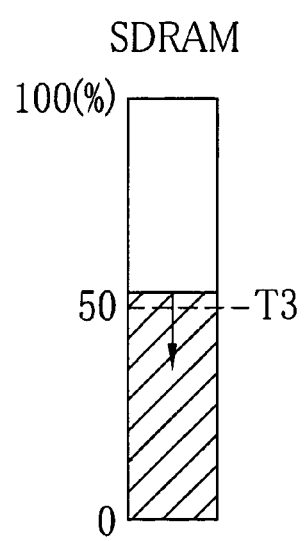
Figure 7E:
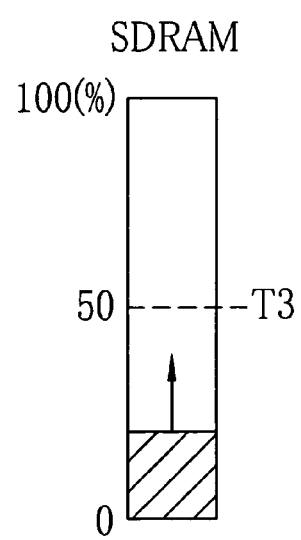

Furthermore, one threshold value may be used. In this case, as shown in FIG. 7, a third threshold value T3 is set near 50% of the memory capacity of the SDRAM 43. As shown in FIG. 7A, when the data amount stored in the SDRAM 43 is less than T3, the frequency of the system clock becomes 48 MHz; meanwhile, as shown in FIG. 7B, when the data amount is more than T3, the frequency becomes 96 MHz. Subsequently, as shown in FIGS. 7C and 7D, when the data mount is more than T3, the frequency is maintained at 96 MHz. As shown in FIG. 7E, when the data mount is less than T3 again, the frequency becomes 48 MHz. Thereby, the data transfer speed can be controlled more easily in comparison with the case wherein two threshold values are used.

Although the above embodiment uses although the digital camera as the example, the present invention can be also applied to other imaging device, such as a cell-phone with camera.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image capturing apparatus having a buffer memory for temporally storing image data output from an imaging device and a recording medium for storing said image data read out from said buffer memory, said buffer memory and said recording medium being operated at a speed based on a system clock, said image capturing apparatus comprising:
    a button when pressed captures a moving image and initiates dynamic controlling of the frequency of said system clock based on image data in said buffer;
    a data-amount detector for detecting an amount of said image data stored in said buffer memory during a capture of said moving image; and
    a clock controller for changing a frequency of said system clock to regulate a transfer speed of said image data from said buffer memory to said recording medium according to said detected data amount,
    wherein said dynamic frequency controlling is performed by said data amount detector and said clock controller, and
    wherein when said moving image data is not captured, said frequency is set to a predetermined speed.

2. An image capturing apparatus as claimed in claim 1, wherein said buffer memory is an SDRAM, and said recoding medium is a memory card.

3. An image capturing apparatus as claimed in claim 1, further comprising: a comparator for comparing said data amount with a first threshold value,
    wherein said clock controller sets the frequency of said system clock at a first value when said data amount is less than said first threshold value, and sets the frequency at a second value when said data amount is more than said first threshold value, said second value is higher than said first value in order to accelerate said transfer speed.

4. An image capturing apparatus as claimed in claim 3, wherein said first threshold value is approximately 50% of a memory capacity of said buffer memory.

5. An image capturing apparatus as claimed in claim 4, wherein at said first threshold value said frequency is 48 MHz, and at said second threshold value said frequency is 96 MHz.

6. An image capturing apparatus as claimed in claim 1, further comprising: a comparator for comparing said data amount with a first threshold value or second threshold value,
    wherein said clock controller changes the frequency of said system clock from said first value to said second value when said data amount is more than said first threshold value, and changes the frequency from said second value to said first value when said data amount is less than said second threshold value, said first threshold value is larger than said second threshold value, said first value is smaller than said second value.

7. An image capturing apparatus as claimed in claim 5, wherein said first threshold value is approximately 60% of a memory capacity of said buffer memory, and said second threshold value is approximately 30% of said memory capacity.

8. An image capturing apparatus as claimed in claim 7, wherein said first value is 48 MHz, and said second value is 96 MHz.

* * * * *